Figure 1:
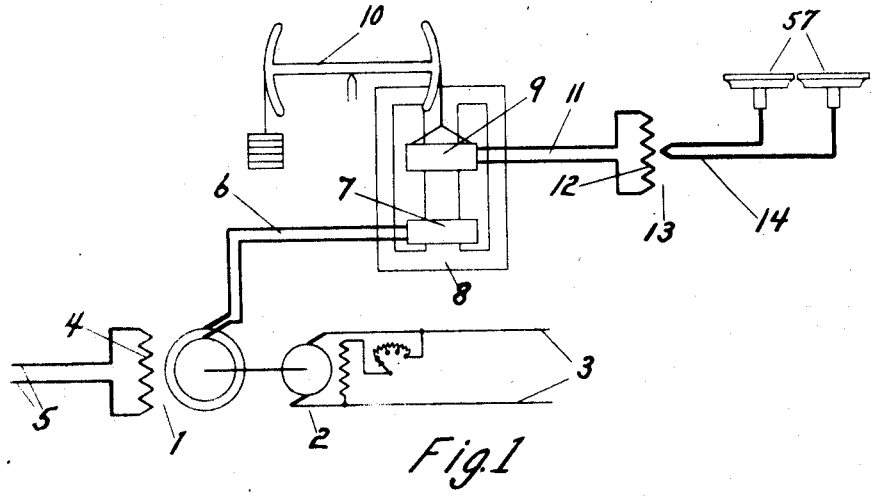

June 30, 1925. 1,544,272

D. F. PANCOAST

METHOD OF AND APPARATUS FOR PRODUCING HIGH FREQUENCY ELECTRIC WELDS
AND PRODUCT RESULTING THEREFROM

Filed Dec. 11, 1924 5 Sheets-Sheet 1

Inventor
Donald F. Pancoast

By Fay, Oberlin & Fay
Attorneys

June 30, 1925.  1,544,272
D. F. PANCOAST
METHOD OF AND APPARATUS FOR PRODUCING HIGH FREQUENCY ELECTRIC WELDS
AND PRODUCT RESULTING THEREFROM
Filed Dec. 11, 1924   5 Sheets-Sheet 5

Inventor
Donald F. Pancoast

By Fay Oberlin & Fay
Attorneys

Patented June 30, 1925.

1,544,272

UNITED STATES PATENT OFFICE.

DONALD F. PANCOAST, OF CLEVELAND, OHIO.

METHOD OF AND APPARATUS FOR PRODUCING HIGH-FREQUENCY ELECTRIC WELDS AND PRODUCT RESULTING THEREFROM.

Application filed December 11, 1924. Serial No. 755,179.

*To all whom it may concern:*

Be it known that I, DONALD F. PANCOAST, a citizen of the United States, and a resident of Cleveland, county of Cuyahoga, and State of Ohio, have invented a new and useful Improvement in Methods of and Apparatus for Producing High-Frequency Electric Welds and Product Resulting Therefrom, of which the following is a specification, the principle of the invention being herein explained and the best mode in which I have contemplated applying that principle, so as to distinguish it from other inventions.

This invention, as indicated, relates to an improved method and apparatus for producing electric welds, and includes the product resulting therefrom. More particularly it comprises welding by means of an alternating current of relatively high-frequency and the principle of the invention is peculiarly adapted for the high-speed production of butt-welded tubing wherein there is no extrusion of a heavy burr or fin at the seam-line and in which a substantially uniform gage is maintained throughout, and the seam-like or weld of which is perfectly continuous and shows uniform metal texture and uninterrupted metal density.

While the invention is described in connection with an apparatus particularly designed for the production of butt-welded tubing, it is to be understood that it is not intended to place any limitation upon the application of the principle of the invention to uses other than those herein particularly described.

Welding, as heretofore practiced in connection with the manufacture of butt-welded tubing, is chiefly founded on the principles disclosed in the patent granted to Otto Parpart, No. 658,741, on September 25, 1900. With the Parpart apparatus the usual rate of tube production is between 15 and 20 feet per minute but is varied with the thickness of the tubing and the quality of the weld desired.

When welding is carried on at the slower tube speeds, fusion and burning of the metal adjacent the seam-line may occur. At the slower speeds a perfect union of the abutted edges is invariably accompanied by an extrusion of metal above and below the seam-line, forming a substantial fin which requires subsequent machining when tubing of approximately standard gage is required. When a higher degree of speed is employed the character of the weld is affected, the seam being interrupted at points and the resulting tube being unsatisfactory for many commercial uses. The seam produced by the welding operation, shows uniform metal texture and density along the seam-line, while at the higher speeds the seam, produced along tube stock of narrower width, shows areas of greater and lesser density or areas wherein welding action has taken place and adjacent areas wherein the welding conditions have been incorrect and the seam is wholly or partially unwelded.

In a welding apparatus developed subsequently to that of Parpart the speed of the tube travel has been increased to a point where the formation of stronger and weaker areas of structure along the seam-line are a characteristic feature of the product. In both the Parpart method and the modification thereof, such as is disclosed in the patent granted to Johnston, No. 1,388,434, August 23, 1921, the apparatus is designed to operate with 60 cycle per second alternating current, and ordinarily from 12,000 to 15,000 amperes are used at 1½ volts.

In the process last referred to a speed of 60 feet and more per minute may be attained and the product thus produced is characterized by a seam having variations in metal texture and density synchronous with the individual current impulses.

In the first described process a uniform temperature wave is caused to travel progressively down the seam-cleft and in that last described a fluctuating temperature wave is carried down the seam-cleft. Each of the methods referred to produces a different character of tubing, that of Parpart carrying a heavy fin or burr continuously above and below the seam-line and the last-named method producing tubing having an interrupted fin of small dimensions, and showing variations in metal texture with alternate areas of greater and lesser density along the seam.

For many uses tubing of substantially uniform gage is required and machining of tubing carrying heavy fins must be resorted to. Where tubing is to be subjected to acid treatment preliminary to certain industrial uses, or where it is to be used for conduits for fluids, there must be no discontinuity in the seam-line or partial interruption of the weld, as the development of a hidden defect may at any time result.

The object of the present invention is to supply a method and apparatus capable of producing tubing at high speed wherein the seam exhibits uniform metal texture and density and which at the same time is substantially free of the enlarged fin or burr on either or both sides of the seam.

Another object of the invention is to control the distribution of welding heat to the abutting edges of the stock through the use of current of adequate frequency rather than through mere changes in current volume with current frequency fixed for all purposes at 60 cycles per second as in the present practice.

Another object of the invention is the provision of an improved form of apparatus, which is of compact structure and free of all overhead obstructions, thus permitting ready observation and control of the welding operation, and at the same time employing short leads to the electrodes, and incorporating features of construction making for the ready adjustability of the operative parts.

Another object of the invention is to provide an improved type of tubing wherein there is no heavy burr and the seam of which is of substantially the gage of the stock, and which has uniform metal texture and density throughout the seam-length.

A further object of the invention is to provide for the beveling of the edges of the metal stock and to maintain under conditions of rapid tube travel the centering of the seam-cleft between the electrodes by means of fixed guides.

Other and further objects of the invention will appear in the course of the following description. To the accomplishment of the foregoing and related ends, said invention, then, consists of the means, method and product hereinafter fully described and particularly pointed out in the claims.

The annexed drawings and the following description set forth in detail certain means and one mode of carrying out the invention, and one product resulting therefrom, such disclosed means, mode and product illustrating, however, but several of various applications of the principle of the invention.

In said annexed drawings:—

Figure 2:
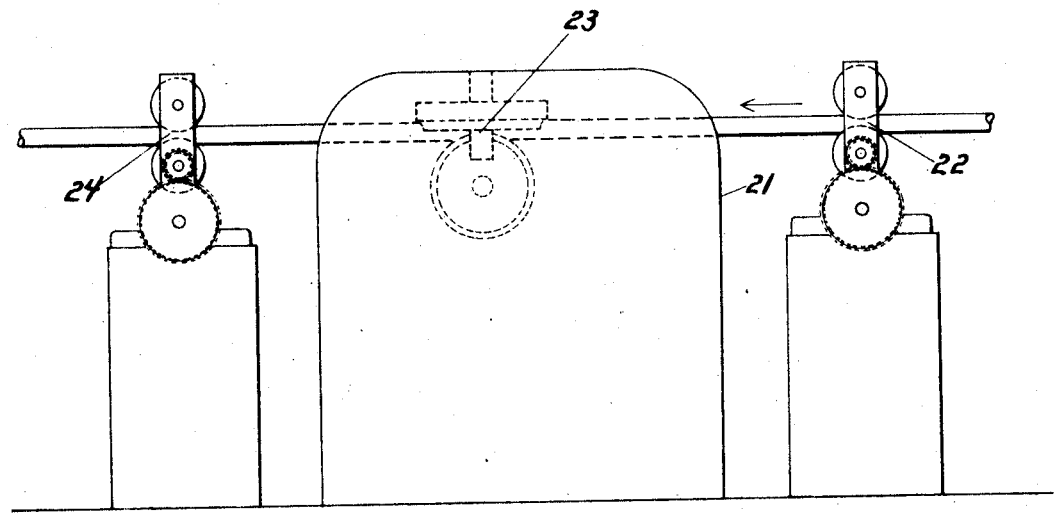
Figure 3:
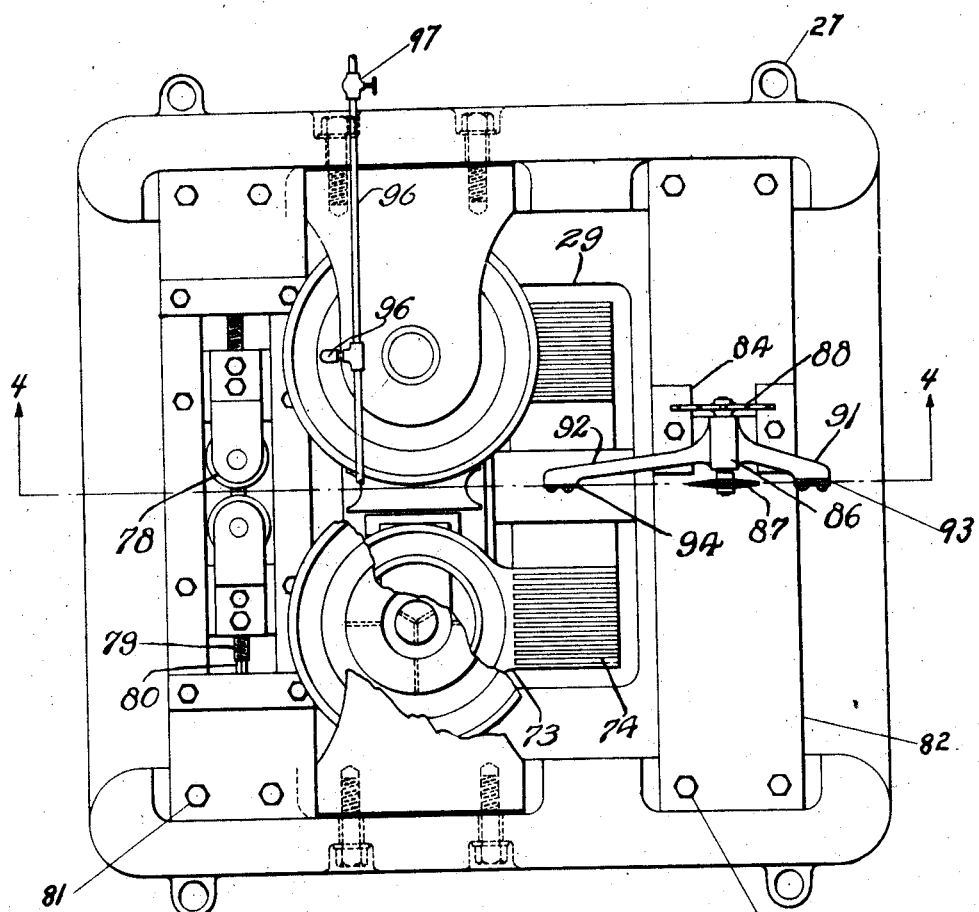
Figure 4:
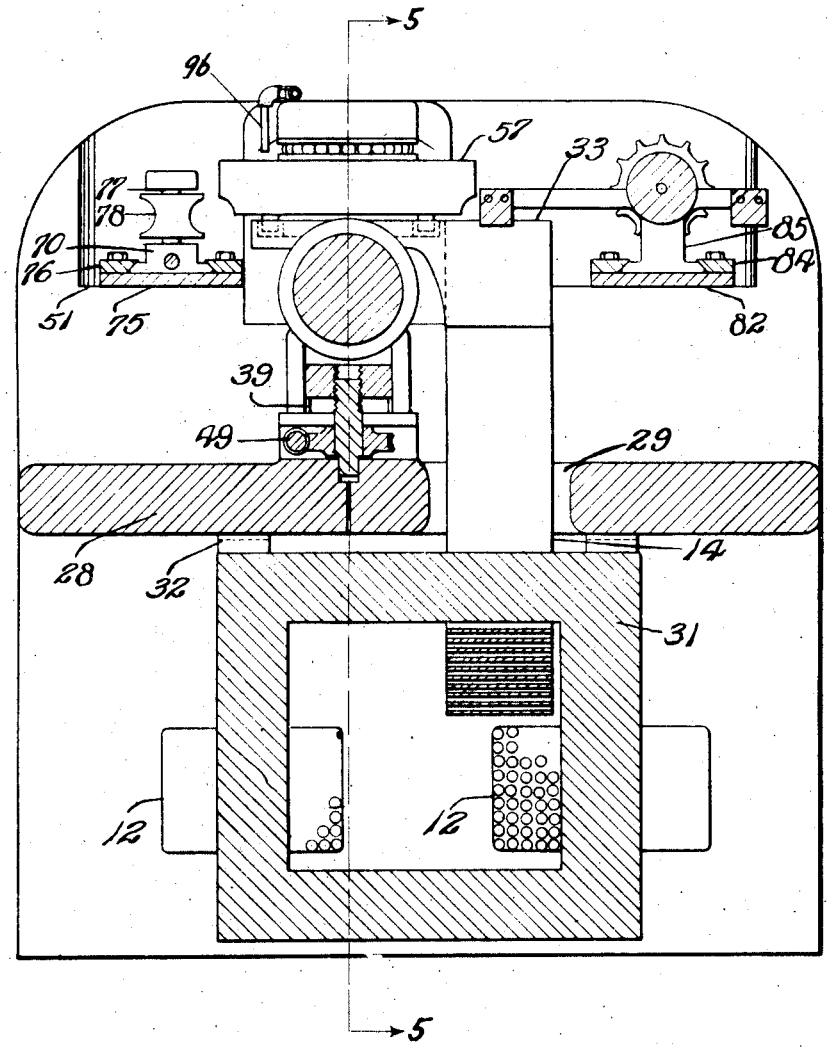
Figure 5:
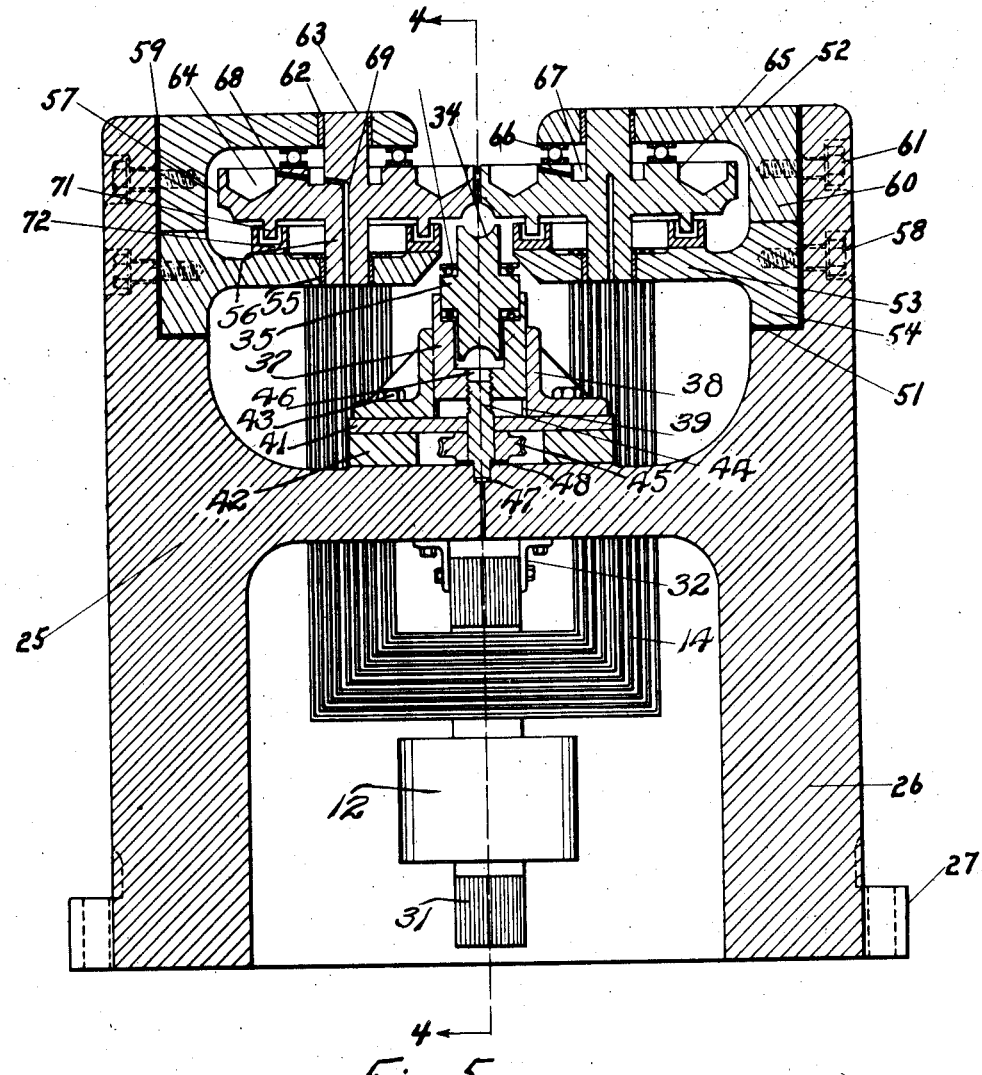
Figure 6:
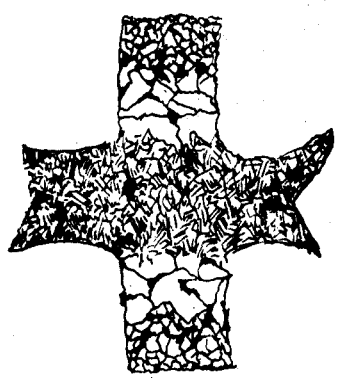
Figure 7:
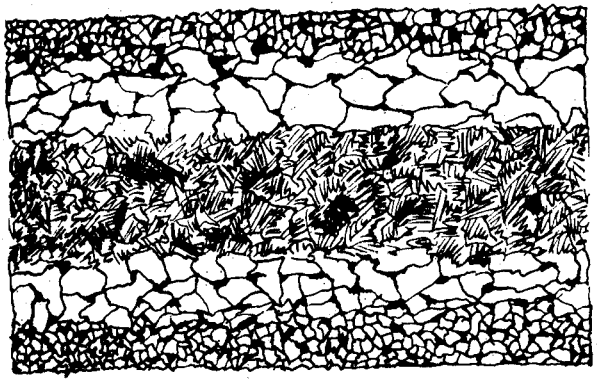
Figure 8:
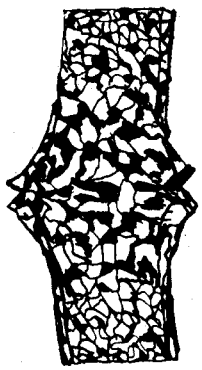
Figure 9:
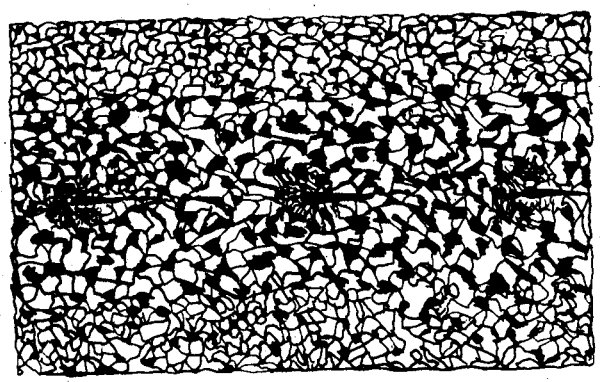
Figure 10:
Figure 11:
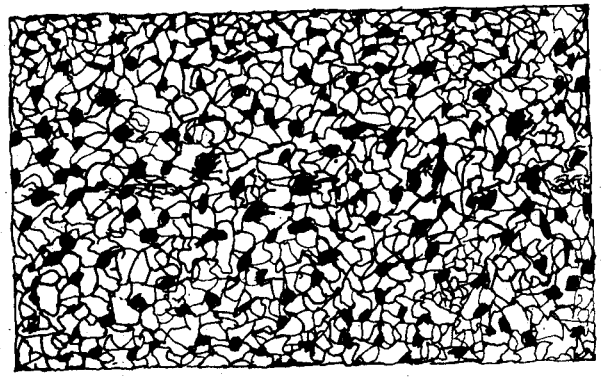

Fig. 1 is a diagrammatic view showing one arrangement of the various electric circuits which may be used in apparatus for carrying out the principle of my invention, including those of adjunctive apparatus for supplying high frequency current of constant volume thereto; Fig. 2 is a side elevation showing the welding apparatus in conjunction with conveying rolls disposed on opposite sides thereof; Fig. 3 is a top plan view of my improved apparatus for the production of high speed butt-welding tubing; Fig. 4 is a vertical sectional view taken along the line 4—4 shown in Figs. 3 and 5, looking in the direction of the arrows; Fig. 5 is a vertical sectional view taken along the line 5—5 shown in Fig. 4, looking in the direction of the arrows; Figs. 6 and 7 are greatly enlarged transverse and longitudinal sections, respectively, illustrating the structure microscopically revealed across and along the seam-line of tubing produced at the rate of substantially 15 feet per minute with 60 cycle per second alternating current having a current volume of from 12,000 to 15,000 amperes at 1½ volts; Figs. 8 and 9 are greatly enlarged transverse and longitudinal sections, respectively, illustrating the structure microscopically revealed across and along the seam-line of tubing produced at the rate of substantially 60 feet per minute with 60 cycle per second alternating current having a current volume of from 12,000 to 15,000 amperes at 1½ volts; and Figs. 10 and 11 are greatly enlarged transverse and longitudinal sections, respectively, illustrating the structure microscopically revealed across and along the seam-line of tubing produced at the rate of substantially 60 feet per minute with 300 cycle per second alternating current having a current volume of from 12,000 to 15,000 amperes at 1½ volts.

As has been above stated, my method, apparatus and product are based principally upon the use of an alternating current of relatively high-frequency. The term "high frequency" as used in this specification refers to high frequency as applied to the art of electric welding and contemplates frequencies measured in terms of hundreds of cycles, rather than the high-frequencies met with in other arts, such as in radio communication, wherein frequencies measured in terms of thousands of cycles are common. Commercial lines usually supply alternating current of a frequency of 60 cycles per second and, through proper transformers, the desired voltage for electric welding, as heretofore practiced, may be readily obtained. When high-frequency welding is to be carried on, as in the method herein disclosed, special sources of proper current supply must be provided. In addition to having a current of proper frequency, I find it desirable, in making a uniform quality of product, to insure a constant current at the electrodes.

One arrangement of apparatus suitable for supplying current of the proper character to the electrodes is shown in Fig. 1 of the drawing, wherein a single phase alternator 1, is driven by suitable power means, shown diagrammatically as an adjustable speed motor 2 operated upon outside power lines 3. The field 4 of the alternator may be supplied by an exciter carried on the alternator shaft, or may be, as shown in the drawing, supplied from direct current power or lighting mains 5.

The current supplied by the alternator is carried by a line 6 to the primary windings 7 of a constant current transformer 8, of conventional form, and the secondary coil 9 is carried upon a counterbalanced support 10, for automatic change of position as required. The secondary coil 9 is connected by a line 11 with the primary 12 of a step-down transformer 13, which is housed within the bed-frame of my improved welding apparatus. The secondary 14 of the step-down transformer comprises a single turn and at its ends is connected with the electrodes, respectively, as will be presently described.

The apparatus described may be designed to produce current of any predetermined frequency and quantity, but I have found that an alternating current having a frequency of 300 cycles per second supplied to the electrodes at about 15,000 amperes and a voltage of about one and one-half, when properly applied to tube stock of 20 gage traversed past the current path at the rate of 60 feet per minute will produce a weld showing uniform metal texture and density along the seam line, and which will be continuous and uninterrupted throughout. Such weld will be of substantially the tube gage, as will be hereinafter pointed out, and may be accompanied by the production of a slight fin or burr of negligible size chiefly upon the outer side of the seam adjacent the electrodes. It is to be emphasized, however, that any such fin or burr is straight and continuous throughout the seam-length.

The term "high speed" as used in the specification and claims refers to relative motion of the stock across the current path of at least twice the speed used with the Parpart machines when speeds of 15 to 20 feet per minute have been employed in producing continuous welds. The speed of operation would, of course, depend upon many factors such as the gauge of the stock, the character of the metal used, the number of alternations of the welding current, the constancy of the current employed, and the effectiveness of the current conductors and electrodes, as well as the adaptability of the parts of the apparatus for continuous rapid operation.

My method then comprises the employment of high-frequency alternating current for electric-welding, and so correlating the same with the rate of travel of the stock past the current path that the heating effect of each impulse overlaps that of the preceding impulse to the end that substantially constant temperature is maintained progressively along the seam-line and the resulting weld is of substantially the tube gage.

The heating effect at the peaks of the successive current impulses is thus blended with the heat retention characteristics of the metal, and the heat radiation factor thereof due to heat conductivity of the metal and speed of the stock across the current path, so accurately that a substantially constant non-fluctuating temperature is maintained at the welding point, and no characteristics of a recurrent welding effect or of temperature variations are present in the product. Furthermore, there is no extrusion of metal in the form of a continuous heavy burr above and below the seam-line, nor is there formed an interrupted burr of any character indicating temperature fluctuations synchronizing with the current impulses. Theoretically there is perhaps no absolutely constant temperature in the physical world, but the term employed in the specification and claims herein, refers to a temperature that is constant in so far as it is possible to measure the same or as evidenced by its physical effects.

Through the balancing of the various factors which enter into the production of an electric weld, a temperature is maintained of such uniformity as to operate continuously progressively along the seam-line in the manner that a temperature dependent upon a constant direct current source with uniform rate of heat dissipation would exhibit. It might be stated in this connection that practical considerations in the design of apparatus prevent the use of a constant direct current for this purpose. Nor is it practical with the present development of the art to employ a rectified uni-directional current in lieu of the alternating current herein described.

Having generally described the principle of my invention and the method of using the same as applied to tube-welding, I will next describe in detail my improved apparatus for producing electric welds and particularly adapted for forming a butt-weld in metal tubing wherein an alternating current of relatively high-frequency is employed.

The welding machine 21, as shown in Fig. 2 of the drawing, is placed in advance of the forming rolls, which are not shown, and may be of any standard make. As the formed stock emerges from the forming apparatus, it is preferably passed through feeding rolls 22, which are power-driven and are accurately aligned with the welding pass 23 or throat of the welding machine. On the opposite side of the welding machine power-driven rolls 24 are preferably provided which serve to apply adequate circumferential pressure to the welded tube to prevent accidental opening of the weld as the tube is returning to normal temperature as well as to traverse the tube.

The welding machine, as is best shown in Figs. 3, 4 and 5, of the drawing, comprises a bed-frame 25 having heavy side walls 26, preferably provided adjacent their lower outer portions with integral lugs 27, by means of which the frame may be firmly secured to a concrete or other base. At an intermediate position, approximately at the mid-height of said side walls, an integral transverse frame member 28 is provided. Rearwardly of the central portion of said member an elongated opening 29 is formed through which the one-turn secondary coil 14 projects toward the electrodes.

Centrally beneath the transverse frame member the laminated core 31 of the step-down transformer 13 is suspended, preferably by means of two pairs of bracket arms 32 of substantial form and material secured to the under face of said transverse frame member. The side walls of the bed-frame and said transverse frame member thus form a substantial housing for the step-down transformer. The primary coils 12 of the transformer 13 are mounted upon the vertical side members of the core, and the single turn of the secondary coil 14 extends beneath the rearward portion of the upper horizontal side member of said core.

The secondary member, as is shown more particularly in Figs. 4 and 5, of the drawing, is made up of ten copper bars preferably six inches wide and one-quarter of an inch thick and spaced from each other one-fourth of an inch for cooling purposes. The upper ends of said secondary coil are provided with heavy copper terminal plates 33, set at right angles to the vertical portions of said secondary coil. The manner of supporting said coil and connecting the same with the electrodes will be hereinafter described.

Upon the upper side of the transverse frame member 28 at a central position immediately in advance of the elongated opening 29, the supporting roll 34 for the tube-stock is positioned. Said roll is provided with a circumferential groove of slightly greater radius than that of the tube-stock and has integral trunnions 35 which are received in ball-bearings 36 mounted upon a U-shaped carriage 37. The lower portion of the carriage is engaged between angle-blocks 38, provided with vertical slideways 39. Said blocks are mounted upon a supporting base comprising a horizontal plate 41 resting upon spaced-apart end blocks 42. Said blocks and supporting members are rigidly secured to the upper face of the transverse supporting member by means of heavy bolts 43. The parts are made separable in order to permit the proper assembly of the carriage-adjusting mechanism. This mechanism comprises a jack-screw 44, carrying a worm-wheel 45 adjacent its lower end and having its screw-threaded upper end projecting through an opening in the plate 41 and into a screw-threaded socket 46 provided in the base of the U-shaped carriage. The lower end of the jack-screw is formed of reduced diameter and is journaled in a cylindrical recess 47 formed in the upper face of the transverse frame member. A ring bearing 48 is interposed between the worm-wheel and the adjacent face of the transverse frame member.

A rotatable worm shaft 49 is journaled in the end blocks 42 and the worm engages the teeth of the worm-wheel. On end of the worm shaft (not shown) projects through its end block and is provided with a squared head whereby it may be rotated. It is obvious that the rotation of the jack-screw follows the actuation of the worm-shaft and that the supporting roll carriage will be elevated or depressed with a very accurate control of adjustment.

The structure at the upper portion of the machine includes the electrode rolls with their supports and accessory devices, the tube guides, rotary file and retaining rolls. In order to provide for the insulation and support of the electrode rolls the upper inner faces of the side walls are cut away to provide shoulders 51, against which the electrode roll supporting plates are adapted to be secured. Said plates comprise upper and lower plates 52, 53, for each electrode roll. The lower plates are provided with heavy flanges 54 at one side and flat body portions which are suitably apertured to receive bushings 55 forming journals for the lower stub-shaft 56 formed on the electrode rolls 57. The lower plates are rigidly secured to the respective side walls by means of suitable bolts 58 and are insulated therefrom by heavy sheet insulation 59. The upper plates are provided with depending flanges 60 which bear against the sheet insulation 59 upon the side walls immediately above the flanges of the lower plates and are secured thereto by means of bolts 61 passing through the side walls. Both the bolts 58 and 61 are provided with sleeves and washers of insulating material so as to prevent electrical contact with the side walls. The flat body portions of said upper plates are provided with apertures in vertical alignment with the apertures formed in the lower plates within which bushings 62 are provided, forming journals for the upper stub shafts 63 formed on the electrode rolls 57.

The electrode rolls are more clearly shown in Figs. 3 and 5 of the drawing, and comprise heavy metal discs of good conducting quality, preferably of copper alloy. Upon the upper side each electrode roll is provided adjacent its circumference with a channel-way 64 adapted to receive cooling fluid. Inwardly of said channelway an upstanding circular support or rib 65 is provided upon which the lower ball-race of the thrust ball-bearing 66 is mounted. The opposing ball-race of said bearing is mounted on the under side of the upper electrode supporting plate. Adjacent the upper stub shaft of the electrode roll an annular depression 67 is provided and suitable radial apertures 68 are formed through the upstanding circular support 65 to admit the cooling fluid to said depressed area. Suitable ducts 69 are formed through the lower stub shafts of the electrodes to permit the cooling fluid to pass from the upper surface of the electrodes to the waste conduits (not shown) within the bed-frame, falling thereinto in the form of separate drops.

Upon the under side of each electrode roll a circular depending flange 71 is provided which serves to conduct the current thereto from the terminal elements of the secondary coil of the step-down transformer. These terminal elements, heretofore referred to, comprise heavy plates 33, preferably formed of copper, and have annular body portions 72 channeled on their upper sides to receive a fluid electrical-conducting element such as mercury. At their rearward sides they are each provided with extension arms 73 formed with a plurality of parallel slots 74 within which the copper bars of the one-turn secondary coil of the step-down transformer are firmly secured.

The terminal plates 33 of the secondary coil are mounted, concentrically of the stub shaft bearing, on the upper side of the respective lower electrode roll supporting plates, and serve to hold the single-turn coil in proper relation to the core of the transformer, as heretofore described.

In addition to supporting the plates which carry the electrode rolls, the shoulders formed adjacent the top of the side walls of the bed-frame carry a transverse plate at the front and at the rear of the machine. The forward plate 75 has bolted to its upper surface at an intermediate point, a pair of parallel inwardly beveled guide strips 76 which engage over the oppositely beveled edges of opposed slide blocks 70, each carrying a vertical spindle 77 upon which a grooved weld-retaining roller 78 is mounted.

A transversely extending adjusting screw 79 engages in threaded apertures formed through the bases of the slide blocks. The threads of said screw are of opposite pitch at its respective ends, as is shown in Fig. 3 of the drawing, and rotation of said adjusting screw by means of the squared head 80 at one end thereof serves to move said weld-retaining rollers toward or away from each other according to the direction of rotation.

The space between the rollers is accurately aligned with the welding throat of the machine and the plate is securely fastened to the shoulders of the side walls by means of heavy bolts 81.

The rearward transverse plate 82 is similarly secured to the shoulders of the side walls by means of heavy bolts 83, and at a central point carries on its upper side a pair of short parallel inwardly beveled guide strips 84 which engage over the oppositely beveled edges of the base flange of a standard 85, which carries at its upper end a transverse journal bearing 86 for a shaft carrying a rotary file 87 at one end and a driving sprocket 88 at the opposite end. The driving connection of the sprocket is not indicated in the drawing but the sprocket may be connected with the same driving means which actuates the conveying rolls 22, 24, shown in Fig. 2.

The file disk is tapered, being of slightly greater thickness at the center than at the edges, and it is preferably driven in an opposite direction to that of the adjacent tube stock and at a slightly higher linear rate of travel. As the lower portion of the file is brought against the spaced edges of the advancing tube stock it forms radial faces on said stock which meet in accurate alignment when the stock is subjected to pressure within the welding throat, that is, the faces on the opposite sides of the seam cleft will abut over substantially their full area when subjected to welding pressure.

Projecting forwardly and rearwardly of the standard adjacent the journal at the upper end thereof, a pair of seam-cleft guide supporting arms are provided. The rearward guide arm 91 is of somewhat less length than the forward guide arm 92 and carries a seam-guide plate 93 of slightly greater thickness than the forward seam-guide plate 94. The rearward seam-guide plate and the file may be of an effective width of about three-sixteenths of an inch, and the forward seam-guide plate of an effective width of one-thirty-second of an inch for thin gage tubing, although obviously the effective width of the guides may be changed as required by the character of the tube stock operated upon, and are readily detachable from the supporting arm.

The cooling medium used upon the electrode rolls will ordinarily be water, and, in Fig. 3 of the drawing, a pipe 95 is shown extending across the upper portion of the machine and provided with nozzles 96 for discharging drops of water at any desired rate into the circumferential channelways. A valve 97 adjacent one side of the machine provides for proper control of the amount of cooling fluid and the temperature of the electrodes may be satisfactorily controlled by the operator.

The operation of the machine has been indicated in the description of its construction but it may again be pointed out that continuous and uniform butt-welding of tubing is accomplished by establishing a balance between a high number of current impulses applied along the seam-line, and the rate of travel of the tube stock transversely of the pressure zone and current path to the end that a uniform non-fluctuating temperature is progressively applied along the seam-line, and uniform metal texture and density of the weld thus brought about, while at the same time the formation of a substantial fin or burr along the seam-line is prevented.

The product resulting from my improved process is shown in Figs. 10 and 11 of the drawing, which represent enlargements of microscopic photographs of transverse and longitudinal sections of a high-frequency welded tube having a uniform metal texture and density along the seam-line, with the weld portion of the tube of substantially the tube gage. While a slight thickening of the seam is disclosed, such increased thickness at no time reaches 25 per cent of the tube gage. Under certain welding conditions where temperature and pressure are relatively higher than required, tubing may be produced by my process which exhibits a continuous fin or burr, but such fin is a narrow width fin of a height of less than one-quarter of the tube gage and may be readily removed by a knife during the welding operation or at any time subsequent thereto.

Ordinarily with the rotary file facing the tube stock edges for accurate meeting along a radial plane and the pair of seam-guide plates accurately holding the seam-cleft centrally between the electrode rolls, with a proper current volume, and a proper balance established between the speed of the stock and the high-frequency rate of the alternating current, the welding pressure will cause merely a slight thickening of the seam above the tube gage and if a fin appears it will be of the narrow width type and of a height of less than one-quarter of the tube gage.

The necessity of employing adequate current impulses to produce tubing having a uniform metal texture and density along the seam-line through an overlapping of the heating effect of each individual current impulse over that of the preceding current impulse with a rate of travel of the stock sufficient to prevent the formation of a substantial burr is obvious from Figs. 6 and 7 and Figs. 8 and 9 of the drawing.

Where tubing is made as in current practice with low-frequency alternating current of 60 cycles per second, a low rate of tube stock travel is necessary to produce a continuous weld having uniform metal texture and density along the seam-line. When adequate time through slow travel of the stock (15 feet per minute) is allowed for the heating effects of the successive 60 cycle impulses to overlap the heat dissipation is inadequate to prevent the formation of a substantial burr when the pressure necessary to effect the weld is applied. The excessive heat results in fern-like characteristics in the metal texture along the seam-line, large grains adjacent to each side of the seam, and a sharp line of demarkation between said area and the standard grain of the tube stock.

When the travel of the tube stock is increased to a rate adequate to avoid the extrusion of a heavy fin (a rate of 60 feet per minute or more), the low-frequency of the alternating current does not admit of an overlapping of the heating effect of the successive impulses, and the welding is caused by the spaced heating effects of single impulses, causing a fluctuating non-uniform temperature progressively along the seam-line and areas of greater and lesser metal density along the weld. The extrusion of metal is less than where slower speed is employed and the burr is of interrupted character and each burr section is of sharp and rounded shape at its respective ends.

The product resulting from my process is available without expensive machining for a wide variety of industrial uses, and has no areas of weaker density along the seam-line which, in various pickling and fabricating processes, would render the product unsatisfactory.

Other modes of applying the principle of my invention may be employed instead of the one explained, change being made as regards the means and the steps herein disclosed and the forms of the product resulting therefrom, provided those stated by any one of the following claims or their equivalents be employed or embodied therein.

I therefore particularly point out and distinctly claim as my invention:—

1. A method of butt-welding by means of an alternating current which includes the step of causing a constant current of high-frequency to flow across the seam-cleft of the stock to be welded progressively of the length thereof.

2. A method of electric butt-welding which includes the steps of establishing an alternating current of high-frequency across the seam-cleft of the stock to be welded, moving said stock at a high speed so correlated with the high-frequency of the current that physical evidence of the intermittent character of the impulses will be eliminated from the completed weld.

3. A method of electric butt-welding metal tubing which includes the steps of establishing an alternating current of high-frequency across the seam-cleft of the stock to be welded, moving said tube stock at at a high speed so correlated with the high-frequency of the current that a constant non-fluctuating heating effect will be maintained along the seam-cleft.

4. A method of electric welding which includes the steps of establishing an alternating current of suitable volume across the seam-cleft of the metal stock to be welded, causing a relative movement of said stock transversely of the current path and adjusting the frequency of the current to the rate of relative movement of the stock so that the heating effect of the current impulses will be uniform and non-fluctuating progressively along the seam-line, with the rate of movement of the stock sufficient to produce adequate heat dissipation to prevent the formation of a burr of substantial size at the seam-line upon the application of suitable welding pressure.

5. A method of alternating current electric welding which includes the steps of establishing a constant current of suitable volume across the seam-cleft of the metal stock to be welded, causing a relative movement of said stock at a speed transversely of the current path sufficient to prevent the formation of a burr of substantial size upon the application of welding pressure, and adjusting the frequency of the current to the rate of relative movement of the stock so that each impulse of said alternating current will have its individual heating effect supplemented by the residual heating effect from a previous impulse to the end that a substantially constant temperature will be maintained along the entire seam-line.

6. A step in the process of forming electric butt-welds in metal tubing which comprises maintaining a minimum welding temperature progressively along the line of the seam-cleft through the overlapping and cumulative effect of the series of current impulses of each unit of seam-length, with a rate of movement of said tube stock insufficient to dissipate through radiation all of the heat of the preceding impulse and adequate to produce a welding temperature at the abutted edges of the stock progressively throughout the seam-length sufficient upon the application of proper pressure to form a union of the abutted edges without extruding metal in the form of a burr of substantial size along the seam-line.

7. A method of high-frequency electric butt-welding which comprises the steps of applying impulsive welding current of high-frequency across the seam-cleft of metal stock, applying welding pressure to close the seam-cleft and traversing the metal stock with reference to the current path at such rate that there will be produced a seam of substantially the gage of the metal stock and of continuous uniform metal texture and density throughout.

8. A method of high-frequency butt-welding for thin gage metal tubing which comprises the steps of establishing a current of adequate volume across the abutted edges of the tube stock, relatively moving said stock with reference to the current path so as to progressively traverse the welding point along the entire seam-length, and regulating the current frequency, current volume and rate of relative movement along the seam-line so that a substantially constant welding temperature is progressively applied to every portion of the seam-cleft, and applying suitable welding pressure to the stock adjacent to the current path to form a seam of substantially the tube gage.

9. A method of high-frequency butt-welding for thin gage steel tubing which comprises the steps of establishing a high-frequency alternating current of suitable volume across the edges of the tube stock, causing a high rate of relative movement of the stock transversely of the current path, establishing such frequency of the alternating current in relation to the speed of the stock, as will bring about a non-fluctuating temperature at the welding point progressively along the seam-line, and supplying adequate welding pressure to the stock to join the abutted edges thereof without forming a burr of a height greater than one-quarter of the tube gage.

10. A method of high-frequency butt-welding for metal tubing, which comprises the steps of establishing a high-frequency current path across the abutted edges of the tube stock, applying pressure to the stock adjacent the current path, and relatively moving the stock with reference to the current path at a sufficiently high speed with relation to successive high-frequency current impulses as to produce adequate heat dissipation to prevent the formation of a substantial burr at the seam-line, and at a rate insufficient to space from each other the heating effects of the several current impulses, along the seam-line, so as to produce non-uniform temperature changes along the weld.

11. A method of high-frequency welding for butt-welding the abutted edges of metal stock which comprises the steps of conducting high-frequency current to the opposite sides of the seam-line of the stock, establishing adequate welding pressure upon the stock to join the opposite edges thereof adjacent the current path, causing high speed longitudinal movement of said stock with reference to the current path, and so correlating the frequency of the current with the speed of said movement of the stock as to cause said seam to be progressively welded at a uniform non-fluctuating temperature throughout its length, the seam-gage being of substantially the gage of the stock and exhibiting no extrusion of metal in the form of a heavy burr along the seam-line.

12. A method of high-frequency butt-welding of metal stock which comprises supporting the abutted edges of the tube stock between the terminals of an alternating current of high-frequency and applying welding pressure at said terminals, and throughout substantially the full circumference of said tube stock in the plane of the current path, moving said tube stock across the pressure area at a rate of travel adequate to uniformly dissipate some of the heating effect of the current impulses to prevent the formation of a substantial burr at the seam-line but leaving a residual heat between successive current impulses adequate to maintain a substantially constant temperature along the seam-line and to produce uniform metal texture and density longitudinally along the weld.

13. A method of high-frequency welding for uniting the butt edges of tube stock which comprises the steps of causing a preformed blank of said stock to move at high speed longitudinally through a combined high frequency current path and welding pressure zone, with the abutted edges of the stock positioned intermediate of the terminals of said high-frequency circuit, establishing the frequency of said current in proportion to said predetermined speed of the stock at a point wherein the heating effect of successive current impulses will overlap to an extent adequate to maintain uniform non-fluctuating temperature progressively along the seam-line but below the point of temperature where heavy extrusion of the metal at the seam-line will result from the predetermined welding pressure.

14. A method of electric welding for uniting the butt-edges of tube stock which includes the steps of causing a preformed blank of said stock to be moved toward the terminals of the alternating current, forming faces on said blank adjacent the seam-cleft which will abut over substantially their full area along a radial plane, when subjected to welding pressure, and applying pressure to said stock adjacent the current terminals to close the seam-cleft.

15. A method of electric welding for uniting the butt-edges of tube stock which includes the steps of causing a preformed blank of said stock to be moved toward the terminals of the alternating current, forming faces on said blank adjacent the seam-cleft which will abut over substantially their full area along a radial plane, when subjected to welding pressure, positively positioning said seam-cleft at an intermediate point between the current terminals, and applying pressure to said stock adjacent the current terminals to close the seam-cleft.

16. A method of electric welding for uniting the butt-edges of tube stock which includes the steps of causing a preformed blank of said stock to be moved toward the terminals of an alternating current, forming faces on said blank adjacent the seam-cleft which will abut over substantially their full area along a radial plane, when subjected to welding pressure, positively positioning said seam-cleft while forming said faces, and applying pressure to said stock adjacent the current terminals to close the seam-cleft.

17. A method of electric welding for uniting the butt-edges of tube stock which includes the steps of causing a preformed blank of said stock to be moved toward the terminals of an alternating current, forming faces on said blank adjacent the seam-cleft which will abut over substantially their full area along a radial plane, when subjected to welding pressure, positively positioning said seam-cleft while forming said faces, and while moving the same to an intermediate point between the current terminals, and applying pressure to said stock adjacent the current terminals to close the seam-cleft.

18. A butt-welding machine for metal tubing having in combination a pair of separate horizontally positioned electrode rolls adapted to bear upon opposite sides of the seam-line of the tube stock and to have peripheral contact with said tube stock only, and a pressure roll, said electrode rolls and pressure roll being each freely spaced from each other, and said three elements cooperating to complete the welding throat for said tube stock.

19. A butt-welding machine for metal tubing having in combination a pair of separate horizontally positioned electrode rolls adapted to bear upon opposite sides of the seam-line of the tube stock and to have peripheral contact with said tube stock only, and an adjustable pressure roll, said electrode rolls and pressure roll being each freely spaced from each other, and said three elements cooperating to complete the welding throat for said tube stock.

20. A butt-welding machine for metal tubing having in combination a pair of separate horizontally positioned electrode rolls adapted to bear upon opposite sides of the seam-line of the tube stock and to have peripheral contact with said tube stock only, thrust bearings adjacent said electrode rolls, and an adjustable supporting roll for applying pressure to said stock and against said thrust bearings, said electrode rolls and pressure roll being freely spaced from each other and said three elements co-operating to complete the welding throat for said tube stock.

21. A butt-welding machine for metal tubing having in combination a pair of separate horizontally positioned electrode rolls adapted to bear upon opposite sides of the seam-line of the tube stock and to have peripheral contact with said tube stock only, thrust ball bearings above said electrode rolls, and an adjustable supporting roll for applying pressure to said stock and against said thrust ball bearings, said electrode rolls and pressure roll being freely spaced from each other and said three elements co-operating to complete the welding throat for said tube stock.

22. A butt-welding machine for metal tubing having in combination a pair of electrodes and a supporting roll forming a welding throat, means for traversing tube stock through said welding throat, and means for forming faces on opposite sides of the seam cleft in advance of the stock entering said welding throat which will abut at the welding point, so that the welding pressure will bring said faces together in a radial plane over substantially their full area.

23. A butt-welding machine for metal tubing having in combination a pair of electrodes and a supporting roll forming a welding throat, means for traversing tube stock through said welding throat, and a rotary file for forming faces on opposite sides of the seam cleft in advance of the stock entering said welding throat which will abut at the welding point, so that the welding pressure will bring said faces together in a radial plane over substantially their full area.

24. A butt-welding machine for metal tubing having in combination a pair of electrodes and a supporting roll forming a welding throat, means for traversing tube stock through said welding throat, and a rotary file of V-shaped half cross-section for forming faces on opposite sides of the seam cleft in advance of the stock entering said welding throat, which will abut at the welding point, so that the welding pressure will bring said faces together in a radial plane over substantially their full area.

25. A butt-welding machine for metal tubing having in combination a pair of electrodes and a supporting roll forming a welding throat, means for traversing tube stock through said welding throat, means for forming faces on opposite sides of the seam cleft in advance of the stock entering said welding throat which will abut at the welding point, so that the welding pressure will bring said edges together in a radial plane, and means for guiding said faces of the tube stock past said beveling means and into the welding throat intermediate of the electrodes.

26. A butt-welding machine for metal tubing having in combination a pair of electrodes and a supporting roll forming a welding throat, means for traversing tube stock through said welding throat, a rotary file of V-shaped half cross-section for forming faces on opposite sides of the seam cleft in advance of the stock entering the welding throat, which will abut at the welding point, so that the welding pressure will bring said faces together in a radial plane, and a seam-guide positioned on either side of said rotary file for centering said tube stock at the file and between the electrodes.

27. An electric butt-welding machine for metal stock having in combination means forming a welding throat, a pair of guides in advance of said throat for centering the seam-cleft of said metal stock between the current terminals, and a file positioned intermediately of said guides and engaging the opposite sides of the seam cleft.

28. An electric butt-welding machine for metal stock having in combination means forming a welding throat, a pair of guides detachably supported in advance of said throat for centering the seam-cleft of said metal stock between the current terminals, and a rotary file positioned intermediately of said guides and engaging the opposite sides of the seam cleft.

29. A high-frequency electric welding machine having in combination a pair of electrodes adapted to contact progressively with the margins of the stock adjacent the seam cleft, and means for supplying a constant current thereto at high frequency.

30. An apparatus for producing butt-welds by means of an alternating current having in combination a pair of terminal electrodes adapted to contact progressively with the stock adjacent the seam-line, means connecting said electrodes with the secondary coil of a step-down transformer, a constant current transformer connected with the primary circuit of said step-down transformer, and means for supplying high-frequency current to said constant current transformer.

31. An electrically butt-welded metal tube wherein the abutting edges are united by a continuous weld presenting substantially uniform metal texture and density throughout its length with its inner and outer surfaces conforming substantially to the tube contour.

32. A thin-walled steel tube having an electrically butt-welded seam, exhibiting a continuous weld along the seam-line with its inner and outer surfaces conforming substantially to the tube contour and of uniform metal texture and density throughout the seam-length.

Signed by me, this 9th day of December, 1924.

DONALD F. PANCOAST.